United States Patent [19]

Horne

[11] 4,319,384

[45] Mar. 16, 1982

[54] KEY RETAINER CLIP

[76] Inventor: Richard J. Horne, 6/26 Devon St., Cheltenham, Victoria, Australia, 3192

[21] Appl. No.: 153,418

[22] Filed: May 27, 1980

[51] Int. Cl.³ ............................ A45F 5/02; A47G 29/10
[52] U.S. Cl. .......................................... 24/3 R; 24/3 L; 24/3 J; 24/3 K; 24/233; 70/456 R; 224/269
[58] Field of Search ................. 24/3 R, 3 L, 3 K, 3 J, 24/3 M, 241 R, 241 S, 233; 70/456 R, 459; 224/255, 253, 269

[56] References Cited

U.S. PATENT DOCUMENTS

| 195,159 | 9/1877 | Peoples | 24/3 J |
|---|---|---|---|
| 1,032,369 | 7/1912 | Baxter | 24/233 |
| 1,075,587 | 10/1913 | McKeen | 24/3 R |
| 1,212,511 | 1/1917 | Kropp | 24/3 K |
| 1,463,071 | 7/1923 | Dow et al. | 24/233 |
| 1,521,811 | 1/1925 | Hartbauer | 24/233 |
| 2,581,825 | 1/1952 | Ah Fong Lau Ah You | 24/3 K |
| 3,621,691 | 11/1971 | Leopoldi | 24/241 R |
| 4,037,443 | 7/1977 | Motzer | 70/459 |
| 4,113,156 | 9/1978 | Brito | 24/3 K |
| 4,164,132 | 8/1979 | Loman | 70/459 |

FOREIGN PATENT DOCUMENTS 472814  7/1952  Italy ..................................... 24/3 R

*Primary Examiner*—Victor N. Sakran
*Attorney, Agent, or Firm*—Bacon & Thomas

[57] ABSTRACT

A clip adapted to carry keys on a key ring and to be moveably attachable to a belt loop, belt or the like, comprising a rotatable trigger mounted in the body of the clip which defines within part of its inner surface and part of the body an enclosed area of a size sufficient to receive the belt loop or belt which trigger, in its normal position, encloses the area but which can be pivotally moved so as to permit reception of the belt loop or belt.

7 Claims, 7 Drawing Figures

U.S. Patent  Mar. 16, 1982  4,319,384
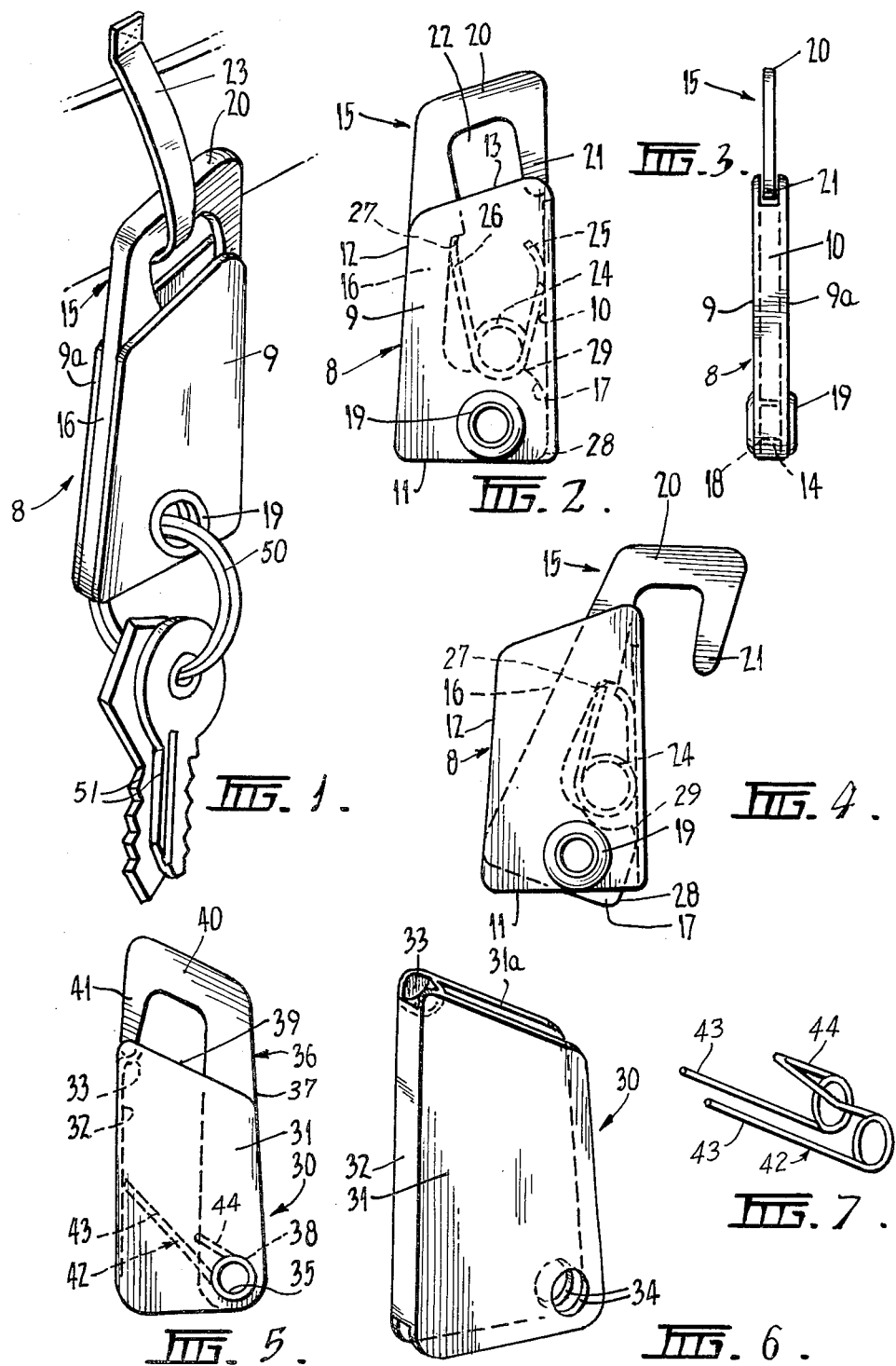

KEY RETAINER CLIP

This invention relates to an improved clip and particularly to a clip which is suitable to carry a bunch of keys and to permit the clip, if required, to be connected to a belt loop or belt to enable the clip and keys to be retained in a safe manner.

At the present time many men wear tight trousers and these make it uncomfortable and/or unsightly to carry keys in pockets and so, often, keys are carried outside pockets by leaving one key or a tab in the pocket or are connected in some way to the belt or belt loop of the wearer. When keys are carried by having one key in the pocket, there is a high possibility that the key in the pocket may be displaced and the keys lost, and when worn in a belt loop or belt, it has conventionally been necessary to provide a clip such as a clip of the type used on dog leads and these are not aesthetically pleasing and, again, can be uncomfortable if placed in a pocket with the keys.

An object of the invention is to provide a clip which is adapted to be associated with a key or keys which is aesthetically pleasing and which is shaped so as to be comfortable when placed in a pocket.

A clip according to the invention has a body including two relatively closely spaced walls, a clip trigger pivotally mounted in the body and biased so that in one position the trigger abuts a stop in the body to define within part of its inner surface and part of the body, an enclosed area of a size sufficient to receive a belt loop or belt and which can be moved from this position to open a mouth between one extremity of the trigger and the body to enable a belt loop or belt to be received.

The clip trigger may be pivotally mounted on an eyelet passing through aligned holes in the walls of the body, said eyelet being capable of receiving a key ring on which keys may be mounted.

The spaced walls forming sides of the body may be connected together along one edge by a web, part of which constitutes a stop for the trigger, and an abutment for a spring normally retaining the trigger in one position.

In order that the invention may be more readily understood reference will now be made to the accompanying drawings illustrating practical embodiments of a clip constructed in accordance with the invention.

In these drawings:

FIG. 1 is a perspective view of one embodiment of the clip connected to a belt loop and supporting a key ring and keys thereon;

FIG. 2 is a side elevation of the embodiment shown in FIG. 1;

FIG. 3 is an end elevation of the embodiment shown in FIG. 1;

FIG. 4 is a similar view to FIG. 2 showing the clip in an open position;

FIG. 5 is a side elevation of a second embodiment of the clip;

FIG. 6 is a perspective view of the outer case of the embodiment shown in FIG. 5; and FIG. 7 is a perspective view of the trigger spring used in the second embodiment.

The clips illustrated may be made of either metal and/or plastic and it is believed that either form could be produced as a promotional product for advertising purposes and could also well be satisfactorily marketed.

The clips illustrated comprise four components, a body or case, a trigger, a trigger spring and an eyelet. In the embodiment illustrated in FIGS. 1 to 4 of the drawings body 8 is formed flat and has two members 9 and 9a which are mirror images of each other and form the sides of the clip, the sides 9 and 9a are interconnected by a web 10 for defining one edge of the clip body 8.

Each of the side portions 9 and 9a has a relatively flat lower end 11 and an upwardly and slightly inwardly extending side 12 and an inwardly and upwardly sloping upper end 13. The fourth side is integral with the web 10. The side portions 9 and 9a are provided adjacent the lower ends 11 thereof with aligned apertures 14.

The clip trigger 15 comprises an arm 16 having a foot formation 17 at its lower end and an aperture 18 therein which corresponds closely in size with the apertures 14 in the body sides 9 and 9a. The trigger foot 17 is adapted to be connected in the body 8 by means of an eyelet 19 which passes through the two apertures 14, the aperture 18 in the trigger which can pivot about said eyelet.

The arm 16 extends upwardly along side 12 and beyond the upper end 13 of the body 8 and has an outwardly directed portion 20 which is adapted to extend across the width of the body above the upper end and has a downwardly directed nose 21 which is of such a length as to extend slightly below the body at the upper edge adjacent the web 10 so that the nose 21 is seated between the upper ends of the sides 9 and 9a just above the end of said web 10.

As will be seen in FIGS. 1 and 2 that when the nose 21 is seated as above described there is an aperture 22 formed which is defined by the upwardly extending body end 13, the inner surface of arm 16, the inner surface of the outwardly directed portion 20 and the inner surface of the nose 21, which aperture is of such a size as to be able to receive a belt loop 23 or belt.

The trigger 15 is normally biased to the above described position by a trigger spring 24 which comprises a single spiral turn with a pair of outwardly extending arms 25 and 26. The spring 24 is positioned between the sides 9 and 9a of the body 8 and sits in an arcuate recess 25 formed in the upper surface of the foot portion 17 of the trigger 15. One spring arm 25 abuts the web 10 and the end of arm 26 abuts a shoulder 27 formed in arm 16 of the trigger 15.

When the trigger 15 is pivoted on the eyelet 19 against the bias of the spring 24 the aperture 22 is opened as shown in FIG. 4 so that a belt loop 23 or belt can be engaged by or released from the clip.

The end 28 of the foot portion 17 of the trigger 15 is arranged to abut the web 10 to form a stop for the pivotal movement of the trigger by the spring 24, while an arcuate portion 29 on the toe of the foot portion permits the required limited pivotal movement of the trigger, as shown in FIG. 4.

In the embodiment shown in FIGS. 5, 6 and 7, the body 30 is of similar construction to that of the first embodiment having two side walls 31 and 31a with edge web 32 which has at the upper end an upwardly extending recess 33. The sides 31 and 31a are provided, adjacent their outer lower corners with an aperture 34 to receive an eyelet 35 which function as a pivot for a trigger 36.

The trigger 36 comprises an arm 37 which has, adjacent its lower end, an aperture 38 which allows the trigger to pivot about eyelet 35. The arm 37 extends upwardly beyond the upper end 39 of the body 30 and has an outwardly directed portion 40 and a downwardly directed nose 41 which seats against the recess 33 formed at the upper end of web 32.

The trigger 36 is normally biased to the position shown in FIG. 5 by a spring 42 which passes around the eyelet 35 on either side of the trigger and has free ends 43 which abut the inner face of web 32 and a U-shaped central portion 44 which extends astride the trigger arm 37 for biasing the trigger 36 to its position where the nose 41 abuts the recess 33.

The eyelet 35 serves a number of purposes, in that it retains the two body sides 31 and 31a together while providing a pivot for the trigger 36 and a support for the spring 42 and at the same time it can receive, as shown in FIG. 1, a key ring 50 onto which keys 51 can be placed.

In both embodiments the sides of the clips are largely unencumbered and they provide a suitable area for advertising material or the like. Thus, the clip can be provided by advertisers and the material will be displayed wherever the clip is being worn.

The open area of the clip beneath the clip trigger may be so formed as to permit the clip to be used as a bottle opener.

It will be understood that the form of trigger and body can be varied for different applications or to provide different appearances and any such variations are considered to be within the scope of the present invention.

I claim:

1. A key retainer clip for connecting a key ring to a belt loop or belt, which clip comprises in combination:
   (a) a body defined by a pair of spaced walls;
   (b) a trigger;
   (c) means for pivotally connecting the trigger between the walls at a point adjacent a first end of the body with an extremity of the trigger extending outwardly from a second end of the body;
   (d) means at the pivot connection point of the trigger for securing a key ring to the body;
   (e) stop means carried by the body for engagement by the trigger;
   (f) a spring disposed between the trigger and a first side of the body for:
      i. biasing the trigger in a closed position in engagement with the stop means wherein the trigger and body define a closed area; and
      ii. permitting the trigger to be pivoted against the bias of the spring into an open position wherein a portion of the extremity of the trigger extends beyond the first side of the body to define an open area for receiving the belt loop or belt therein; and wherein
   (g) the trigger includes an arm extending along and across the width of the spaced walls to define, with the corresponding edges of the spaced walls, a second side opposite the first side and having a substantially coplanar surface when the trigger is in the closed position.

2. The clip of claim 1 wherein the spaced walls further define faces of the body that are connected together along the first side by a web which includes:
   (a) a first part defining the stop means for engagement by the trigger in the closed position; and
   (b) a second part for limiting the pivotal movement of the trigger against the bias of the spring when the trigger is placed in the open position.

3. The clip of claim 2 wherein the extremity of the trigger further includes a nose portion directed backwardly and having an end which terminates adjacent the second part of the web.

4. The clip of claim 3 wherein the first part of the web includes a recess for engaging the end of the nose when the trigger is in the closed position.

5. The clip of claim 1 wherein the spring is disposed between the spaced walls and includes a single spiral and a pair of outwardly extending arms.

6. The clip of claim 5 wherein the trigger includes:
   (a) an arcuate recess for seating the single spiral; and
   (b) a shoulder for abutting one of the outwardly extending arms.

7. The clip of claim 1 wherein the spring is disposed around the pivot connection point and includes a U-shaped central portion which extends astride the trigger.

* * * * *